(12) United States Patent
Heimer

(10) Patent No.: US 8,755,123 B2
(45) Date of Patent: Jun. 17, 2014

(54) COMPACT OBJECTIVE LENS ASSEMBLY FOR SIMULTANEOUSLY IMAGING MULTIPLE SPECTRAL BANDS

(71) Applicant: DRS RSTA, Inc., Dallas, TX (US)

(72) Inventor: Richard J. Heimer, Melbourne, FL (US)

(73) Assignee: DRS RSTA, Inc., Dallas, TX (US)

( * ) Notice: Subject to any disclaimer, the term of this patent is extended or adjusted under 35 U.S.C. 154(b) by 78 days.

(21) Appl. No.: 13/672,286

(22) Filed: Nov. 8, 2012

(65) Prior Publication Data

US 2013/0188056 A1 Jul. 25, 2013

Related U.S. Application Data

(63) Continuation of application No. 12/388,783, filed on Feb. 19, 2009, now Pat. No. 8,331,032.

(51) Int. Cl.
*G02B 27/14* (2006.01)
*G02B 5/04* (2006.01)

(52) U.S. Cl.
USPC .............................................. 359/630; 359/834

(58) Field of Classification Search
None
See application file for complete search history.

*Primary Examiner* — Jade R Chwasz
(74) *Attorney, Agent, or Firm* — Kilpatrick Townsend & Stockton LLP

(57) ABSTRACT

An objective lens assembly suitable for use in helmet-mounted applications. The objective lens assembly comprises two prisms that collectively are configured, oriented and bonded relative to each other to separate and allow simultaneous imaging of two separate spectral bands (such as VNIR and LWIR bands) received from the same object scene via a common window such that the object scene may be viewed from the same perspective without the effects of parallax.

10 Claims, 6 Drawing Sheets

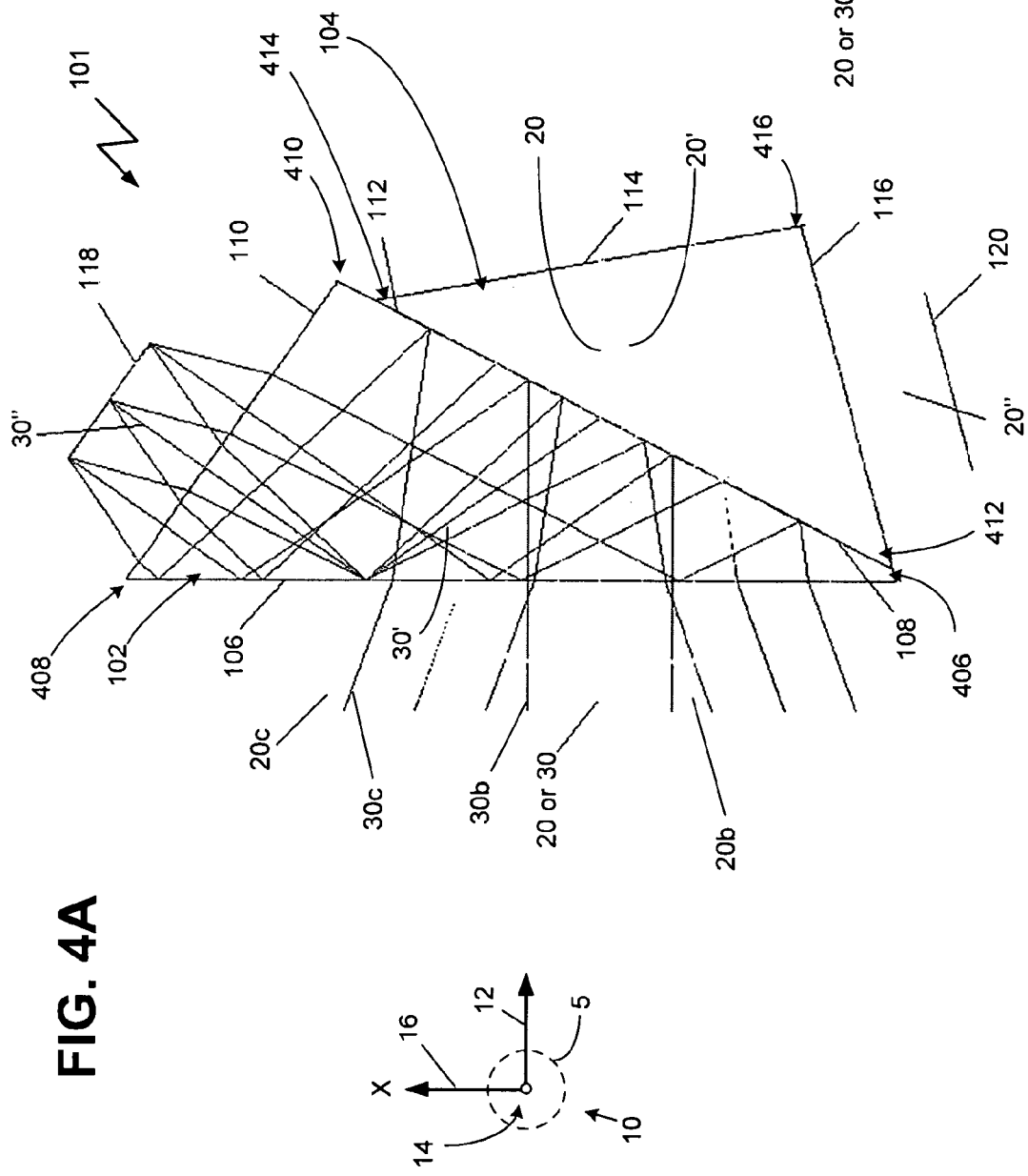
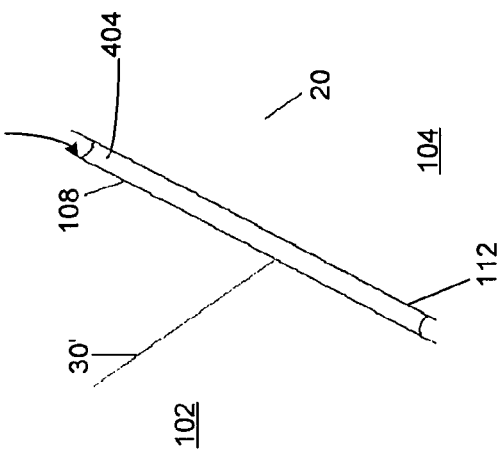

COMPACT OBJECTIVE LENS ASSEMBLY FOR SIMULTANEOUSLY IMAGING MULTIPLE SPECTRAL BANDS

CROSS-REFERENCE TO RELATED APPLICATION

This application is a continuation of U.S. patent application Ser. No. 12/388,783, filed Feb. 19, 2009, the contents of which is hereby incorporated in its entirety by reference.

FIELD OF THE INVENTION

The present invention relates to image-forming optical systems for applications in the visible, near infrared and thermal infrared regions of the electromagnetic spectrum. In particular, the present invention relates to a compact objective lens assembly having a single entrance pupil and two prisms arranged in an angular relationship to one another such that two or more spectral bands received though the entrance pupil are separated by the two prisms for simultaneous imaging and the optical path associated with each spectral band conforms to a surface of a helmet or other headgear.

BACKGROUND OF THE INVENTION

With the advent of small, low power stand-alone electronic type cameras for the detection of visible, near-infrared (VNIR) and long-wave infrared (LWIR) images (such as the conventional image-intensified CMOS imager for VNIR image detection and the uncooled micro-bolometer focal plane array imager for LWIR image detection), the number of applications for these types of VNIR or LWIR cameras has expanded to include hand-held, weapon-borne and helmet-mounted applications. However, the conventional VNIR and LWIR cameras each have an image-forming optical systems or objective lens assembly that is typically too long in a field-of-view axis to be suitable for use in hand-held, weapon-borne and helmet-mounted applications.

The present inventor has disclosed, in U.S. patent application Ser. No. 11/539,804, a dual-field-of-view objective lens assembly that is compact and thin in the object side direction such that the objective lens assembly is suitable for use in hand-held, weapon-borne and helmet-mounted applications. However, the disclosed dual-field-of-view objective lens assembly requires separate prism lens groupings with respective entrance pupils for viewing two spectral band images, such as VNIR and LWIR images. Thus, there is a need for a compact lens assembly that employs fewer optical components for simultaneously imaging two or more spectral band images, for example, within the VNIR waveband and the LWIR waveband.

U.S. Pat. No. 7,248,401 (the "'401 patent") discloses a common-aperture, multispectral objective device that uses a folded beam-splitter and mirror to simultaneously image near infrared (NIR) and LWIR spectral bands. However, the objective device disclosed in the '401 patent when implemented for demonstration to the US Army was found to be susceptible to producing an undesirable forward projection. In addition, the '401 patent's objective device is neither compact in the object direction nor form-fitting to a helmet or other headgear.

Conventional color separating prism assemblies, such as disclosed in U.S. Pat. Nos. 6,667,656; 6,517,209; and 6,078,429, also employ a common aperture for receiving an incoming light beam from an objective lens assembly. However, conventional color separating prism assemblies are not suitable for use as an objective lens or for separating spectral bands within the infrared band for simultaneous imaging. In addition, conventional color separating prisms are neither compact in the object direction nor form-fitting to a helmet or other headgear.

Therefore, a need exists for an objective lens assembly that overcomes the problems noted above and others previously experienced for simultaneously imaging multiple spectral bands, for example in the VNIR and the LWIR bands, for use in hand-held, weapon-borne and helmet-mounted applications.

SUMMARY OF THE INVENTION

Optical systems and assemblies consistent with the present invention provide a compact objective lens assembly suitable for use in helmet-mounted applications. The objective lens assembly is configured to allow simultaneous imaging of two separate spectral bands (such as VNIR and LWIR bands) received from the same object scene via a common window such that the object scene may be viewed from the same perspective without the effects of parallax.

In one embodiment, the objective lens comprises a first prism and a second prism. The prisms are configures to effectively enable the principal ray optical path of a first band (e.g., LWIR band) through the first prism and a principal ray optical path of a second band (e.g., VNIR band) through the first prism and the second prism so that each optical path conforms to a compound surface of a helmet. The first prism has, in sequence of light propagation from an object, a first transmitting surface A defining an entrance pupil of the objective lens assembly, a partial reflecting surface B and a second transmitting surface C. The first transmitting surface A is operatively configured to pass light from the object to the partial reflecting surface B. The partial reflecting surface B is operatively configured to reflect a first portion of the passed light associated with a first of a plurality of infrared spectral bands back towards the first transmitting surface A so that the reflected first portion of the passed light is totally internally reflected (TIR) by the first transmitting surface A towards the second transmitting surface C. The second transmitting surface C is operatively configured to allow the reflected first portion of the passed light from the first transmitting surface A to pass through and exit the first prism. The partial reflecting surface B is further configured to transmit a second portion of the passed light associated with a second of the infrared spectral bands towards the second prism. The second prism has, in sequence of light propagation from the object, a first transmitting surface D, a reflecting surface E and a second transmitting surface F. The first transmitting surface D is operatively configured to pass the second portion of light exiting the partial reflecting surface B of the first prism to the reflecting surface E of the second prism. The reflecting surface E is operatively configured to reflect the second portion of passed light back towards the first transmitting surface D so that the reflected second portion of the passed light is totally internally reflected (TIR) by the first transmitting surface D towards the second transmitting surface F. The second transmitting surface F is operatively configured to allow the reflected second portion of the passed light from the first transmitting surface D to pass through and exit the second prism.

In one implementation, the first prism has a dichroic coating that defines the partial reflecting surface B of the first prism and is adapted to reflect the first portion and transmit the second portion of the passed light. In this implementation, the first portion of the passed light is within the long wave infrared band and the second portion of the passed light is within the near-infrared band.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate implementations of the invention and, together with the description, serve to explain the advantages and principles of the invention. In the drawings.

FIG. 4A is a sectional view of one embodiment of an objective lens assembly of the imaging device consistent with the present invention, where the objective lens assembly includes a first prism and a second prism operatively configured for simultaneously separating a specular light waveband and emitted light waveband emanating from the object and entering a first transmitting surface of the first prism;

FIG. 4B is a magnified sectional, cutaway view of a bonding layer attaching a partial reflecting surface of the first prism operatively configured to reflect the emitted light waveband towards the first transmitting surface of the first prism and a transmitting surface of the second prism operatively configured to receive and internally transmit the specular light waveband that passes through the partial reflecting surface of the first prism and the bonding layer to the transmitting surface of the second prism;

DETAILED DESCRIPTION OF THE INVENTION

Optical systems and imaging assemblies consistent with the present invention provide a compact objective lens assembly suitable for use in helmet-mounted applications. The objective lens assembly is configured to provide simultaneous imaging of two separate spectral bands (such as visible-near infrared (VNIR) and long wave infrared (LWIR)) so that the optical path of each respective spectral band through the objective lens assembly conforms to a compound surface of a helmet while enabling the objective lens assembly to be compact in size.

Figure 1:
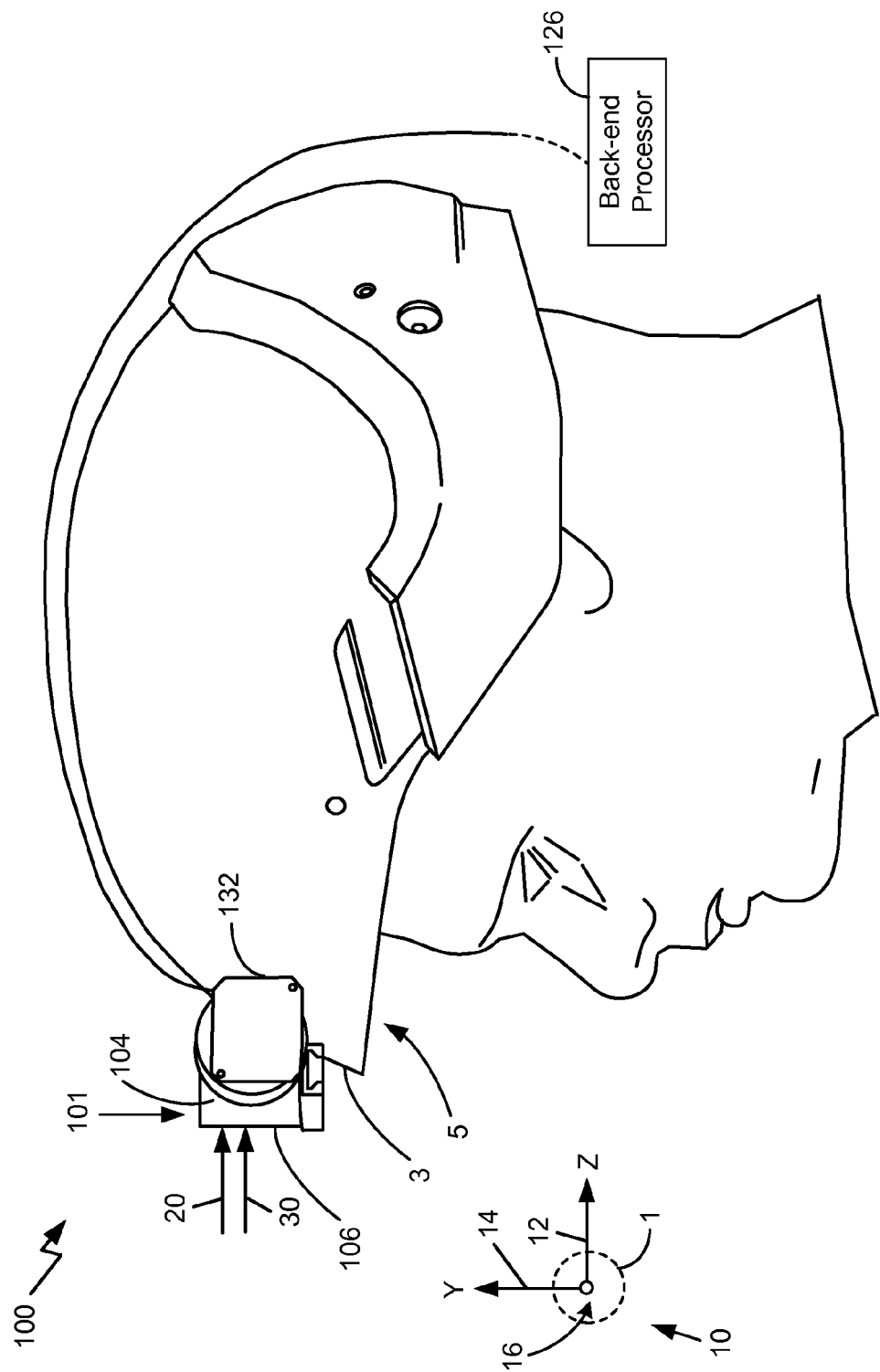
FIG. 1 is a perspective side view of an exemplary imaging device for simultaneously imaging two separate wavebands emanating from an object in accordance with the present invention, where the imaging device is mounted on a helmet.
Figure 2:
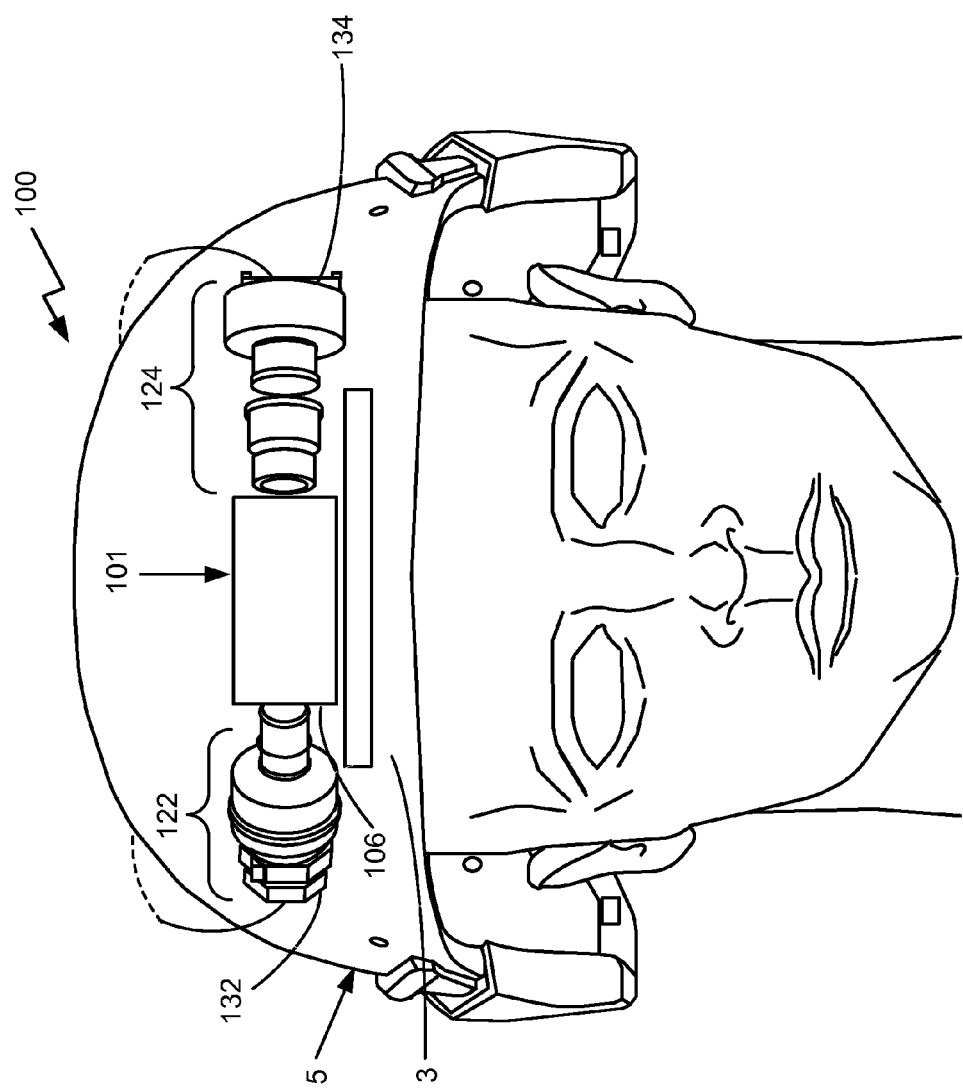
FIG. 2 is a perspective front view of the imaging device mounted on the helmet.
Figure 3:
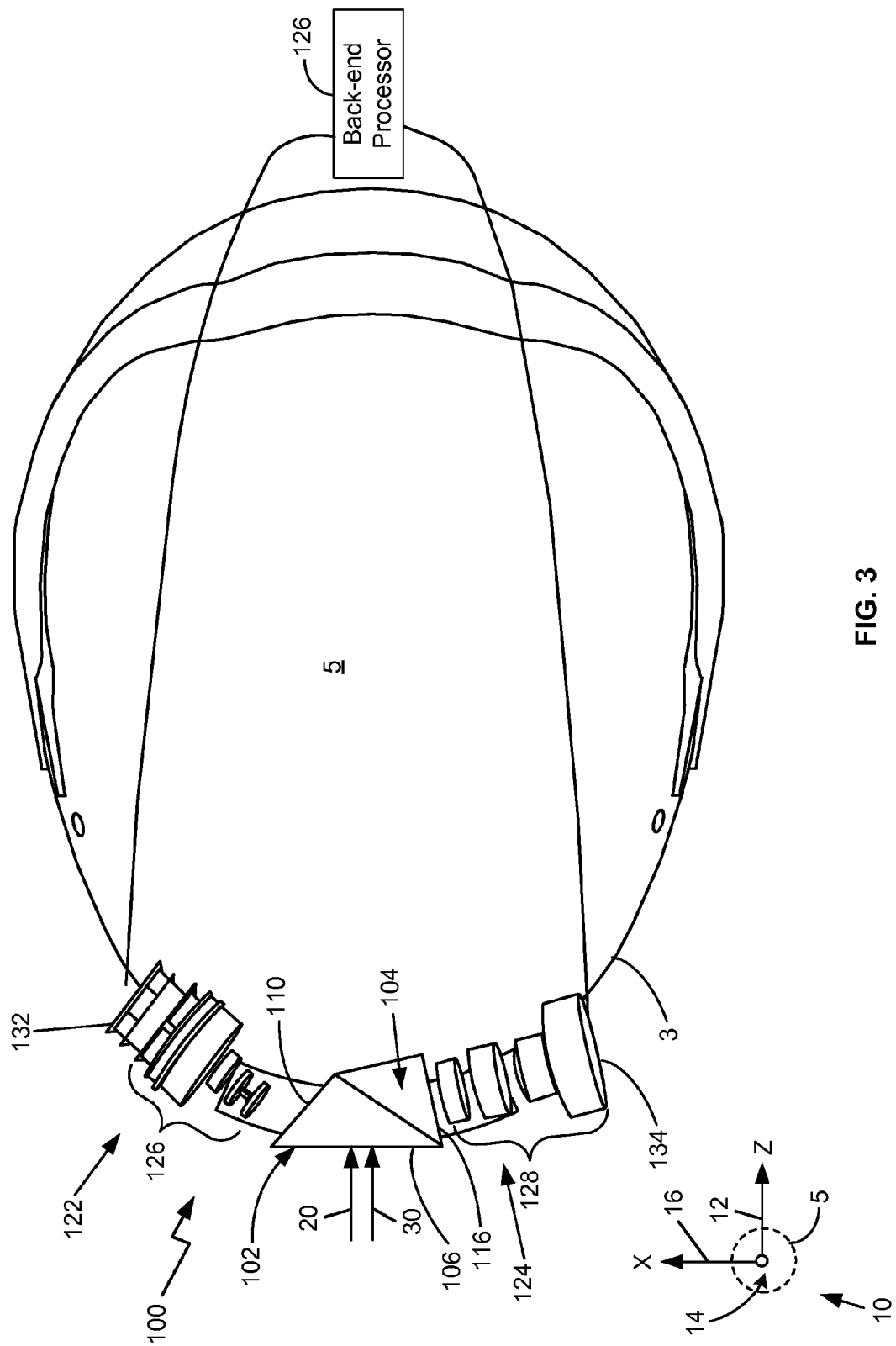
FIG. 3 is a perspective top view of the imaging device mounted on the helmet.

FIGS. 1, 2 and 3 are sectional side, front and top views, respectively, of one embodiment an imaging device 100 consistent with the present invention for simultaneously imaging two separate wavebands emanating from an object 1. The imaging device 100 comprises an objective lens assembly 101 mounted on a compound surface 3 of a helmet 5. The objective lens assembly 101 includes a first prism 102 and a second prism 104 operatively configured to collectively function as a waveband separating means to separate a first light waveband or emitted light waveband (e.g., LWIR band), and a second light waveband or reflected specular light waveband (e.g., VNIR band) emanating from an object 10 or scene. The combined wavebands are received by the objective lens assembly 101 via a common entrance pupil, which in the implementation shown in FIGS. 1-3 is a first transmitting surface A (106) of the first prism 102. The respective wavebands are subsequently separated via the prisms 102 and 104 and transmitted through a respective exit pupil (e.g., transmitting surfaces 110 or 116 as best shown in FIG. 4A) to a corresponding objective lens entrance pupil plane (e.g., pupil plane 118 or 120 as best shown in FIG. 4A) for capture by a respective camera (e.g., LWIR camera 122 and VNIR camera 124) and processing by a common backend processor 126 as described in further detail below.

Each camera 122 and 124 has a respective waveband objective lens assembly 128 or 130 coupled to or incorporating the respective objective lens entrance pupil plane 118 or 120 and a respective pixel focal plane array 130 or 132 for capturing the respective wavebands separated by the prisms 102 and 104. In the implementation shown in FIGS. 1-3, the objective lens assembly 101 is arranged in combination with each camera waveband lens assembly 128 and 130 and corresponding pixel focal plane array 130 or 132 so that each combination of camera waveband lens assembly 128 and 130 and corresponding pixel focal plane array 130 and 132 are disposed along and conform to the compound surface 3 of the helmet 5. This arrangement enables the imaging device 100 to be compact in size and have a low projection profile with respect to the helmet 5.

For clarity in the discussion to follow, the objective lens assembly 101 is oriented in reference to the object 5 or scene (from which the combined wavebands are reflected or are emitted), which has a body coordinate system 10. The body coordinate system 10 of the object (and the objective lens assembly 101) has a Z-axis 12, a Y-axis 14 (into the page in FIG. 2), and a X-axis 16 (into the page in FIG. 1). A first axial principal ray 20 received by the objective lens assembly 101 is defined as an emitted ray of the first light waveband (e.g., LWIR) emerging from the center of the object 5 that is incident on the entrance pupil or first transmitting surface 106 of the first prism. Another axial principal ray 30 received by the objective lens assembly 100 is defined as a ray of the second light waveband (e.g., VWIR) emerging from the center of the object that is incident on the entrance pupil or first transmitting surface 106 of the first prism. The axial principal rays 20 and 30 define the Z-axis 12 of the body coordinate system 10 for the object and the respective objective lens assembly 101. The axial principal rays 20 and 30 are shown spaced apart in FIG. 1, but may be received on the entrance pupil 106 of the objective lens assembly 101 as a combined signal or sequential signals on the same Z-axis 12 as shown, for example, in FIG. 4A.

The direction in which the Z-axis 12 extends from the object to the entrance pupil or the first surface (e.g., surface 106) of the objective lens assembly 101 is defined as positive. The body coordinate system 10 follows the known right hand rule with reference to the axial principal rays 20 and 30 to define the Y-axis 14 of the object and the objective lens assembly 101 as being orthogonal and vertical to the Z-axis 12. The X-axis 16 is orthogonal to both the Z-axis 12 and the Y-axis 14. In the various illustrations given for each embodiment or example of an objective lens assembly consistent with the present invention, the direction of light propagation is initially from along the positive Z-axis 12. Reflecting surfaces of the objective lens assembly 101 may subsequently reverse the direction of the light propagation. Therefore, after an odd number of reflections, the Z-axis 12 will be negative.

As discussed below, the axial principal ray 20 of the first band (referenced hereafter as the "LWIR principal ray 20") forms a respective optical path through the first prism 102 and subsequently through the LWIR camera objective lens assembly 128 to the pixel focal plane array 132 while the axial principal ray 30 of the second band (referenced hereafter as the "VNIR principal ray 30") forms a respective optical path through the first prism 102 and the second prism 106 and subsequently through the VNIR camera objective lens assembly 130 to the pixel focal plane array 134.

FIG. 4A depicts a sectional view of one embodiment of the objective lens assembly 101 of the imaging device 100 consistent with the present invention. As shown in FIG. 4A, the first prism 102 has, in sequence of light propagation from the object, a first transmitting surface A 106 defining the entrance pupil of the objective lens assembly 101, a partial reflecting surface B 108 and a second transmitting surface C 110. The first transmitting surface A 106 is operatively configured to pass light (including both the LWIR principal ray 20 and the VNIR principal ray 30) from the object to the partial reflecting surface B 108. The partial reflecting surface B 108 is operatively configured to reflect a first portion of the passed light (e.g., ray 30' in FIGS. 4A and 4B) associated with a first of a plurality of infrared spectral bands (e.g., the LWIR band) back towards the first transmitting surface A 106 so that the reflected first portion of the passed light is totally internally reflected (TIR) by the first transmitting surface A 106 towards the second transmitting surface C 110. The second transmitting surface C 110 is operatively configured to allow the reflected first portion of the passed light from the first transmitting surface A 106 (e.g., the LWIR band) to pass through and exit the first prism 102 towards the objective lens entrance pupil plane 118. The partial reflecting surface B 108 is further configured to transmit a second portion of the passed light (e.g., ray 20 in FIGS. 4A and 4B) associated with a second of the infrared spectral bands (e.g., the VNIR band) towards the second prism 104.

The second prism 104 has, in sequence of light propagation from the object, a first transmitting surface D 112, a reflecting surface E 114 and a second transmitting surface F 116. The first transmitting surface D 112 is operatively configured to pass the second portion of light (e.g., the VNIR band) exiting the partial reflecting surface B 108 of the first prism 102 to the reflecting surface E 114 of the second prism 104. The reflecting surface E 114 is operatively configured to reflect the second portion of passed light back (e.g., the VNIR band) towards the first transmitting surface D 112 so that the reflected second portion of the passed light (e.g., ray 20) is totally internally reflected by the first transmitting surface D 112 towards the second transmitting surface F 116. To reflect the second light band (e.g., VNIR band) back towards the first transmitting surface D 112 of the second prism 104, the reflecting surface E 114 of the second prism 104 may have a metallic or dielectric mirror coating. The second transmitting surface F 116 is operatively configured to allow the reflected second portion of the passed light from the first transmitting surface D 112 (e.g., the reflected VNIR band) to pass through and exit the second prism 104 towards the objective lens entrance pupil plane 120.

In one implementation, the first prism 102 may be constructed from a thermal infrared transmitting material having a refractive index ($n_2$), at a wavelength of 10 micrometers, greater than 2.3. The second prism may be constructed from a thermal infrared transmitting material having a refractive index ($n_4$), at a wavelength of 0.85 micrometers, greater than 2.0. In this implementation, the first prism 102 and the second prism 104 may each comprise or be formed of an optical material capable of transmitting the near-infrared (NIR) and thermal infrared regions of the electromagnetic spectrum. For example, each of the prisms 102 and 104 may comprise or be formed of zinc selenide or zinc sulfide. In another implementation, prism 104 may comprise or be formed of an optical glass (such as glass type S-LAH79, commercially available from the OHARA Corporation).

In one implementation, a short-pass dichroic coating 402 is deposited on the surface B 108 as shown in FIG. 4B to define or create the partially reflecting surface B 108 and enable the partially reflecting surface B 108 to reflect the first light waveband (e.g., LWIR band wavelengths reflected by the LWIR principal ray 30 and other LWIR rays 30*b* and 30*c* incident on the entrance pupil 106) that pass through the entrance pupil 106 and are incident on the partial reflecting surface B. The short-pass dichroic coating 402 is configured to transmit the second light waveband (e.g., VNIR band wavelengths reflected by the VNIR principal ray 20) that has shorter wavelengths then the first light waveband to pass through the dichroic coating 402 towards the first transmitting surface D 112 of the second prism 104. In one implementation, the dichroic coating 402 is adapted reflect a wavelength within a range of 8 μm to 12 μm corresponding to the first light waveband (e.g., the LWIR band) and to transmit a wavelength within a range of 0.6 μm to 0.9 μm corresponding to the second light waveband (e.g., VNIR band).

In one implementation, the objective lens assembly 101 includes a bonding layer 404 disposed between the partial reflecting surface B 108 of the first prism 102 and the first transmitting surface D 112 of the second prism 104. The bonding layer 404 comprises an optical bonding material or cement epoxy that transmits a wavelength within the second light waveband. In the implementation in which the dichroic coating 402 transmits light within the near-infrared (NIR) band, the bonding layer 404 comprises an optical bonding material (such as NOA-61 or NOA-71 commercially available from Norland Co., Ltd), that transmits a wavelength within the near-infrared band. A ratio ($n_3/n_2$) of a refractive index ($n_3$) of the bonding layer to a refractive index ($n_3$) of the first prism is equal to or greater than 0.650. The bonding layer 402 has a thickness (t) preferable within the range of 0.20 mm to 0.30 mm. Since the spacing between the first prism's partial reflecting surface B 108 and the first transmitting surface D 112 of the second prism 104 is filled in this implementation with the bonding layer 404, the bonding layer 404 prevents ghost images from appearing in either camera image plane 118 or 120 due to light from the second waveband exiting the first prism 102 via the partially reflecting surface B 108 and being refracted or reflected by the surfaces on either side of the air gap between the two prisms 102 and 104.

In one implementation, the first prism 102 has internal apex angles of approximately 27.5° (406 in FIG. 4A), 55° (408), and 97.5° (410). In this implementation, the second prism 104 has internal angles of approximately 47.5° (412 in FIG. 4A), 38° (414), and 94.5° (416). In this configuration, the objective lens assembly 101 has a thickness (d) along the Z-axis 12 of 25 millimeters or less. Thus, the projection profile of the objective lens assembly (and, thus the imaging device 100) relative to the helmet 5 is less than other conventional helmet mounted imaging devices or cameras. In this implementation, the entrance pupil 118 of the LWIR camera 122 is approximately parallel to the second transmitting surface C 110 of the first prism 102 such that the entrance pupil plane 118 is disposed at an angle of 56 degrees or more from the Z-axis 12 or central axis of the helmet 5, allowing the LWIR camera 122 to be disposed along the compound surface 3 of the helmet 5 in a direction from the front of the helmet where the objective lens assembly 101 is disposed towards the rear of the helmet 5. Similarly, in this implementation, the entrance pupil plane 120 of the VNIR camera 124 is approximately parallel to the second transmit surface F 116 of the second prism 104 such that the entrance pupil 120 is disposed at an angle of 75 degrees or more from the Z-axis 12 or central axis of the helmet 5, allowing the VNIR camera 124 to be disposed on the opposite side of the helmet 5 from the LWIR camera 122 along the compound surface 3 of the helmet 5 in a direction from the front of the helmet 5 where the objective lens assembly 101 is disposed towards the rear of the helmet 5.

Figure 5:
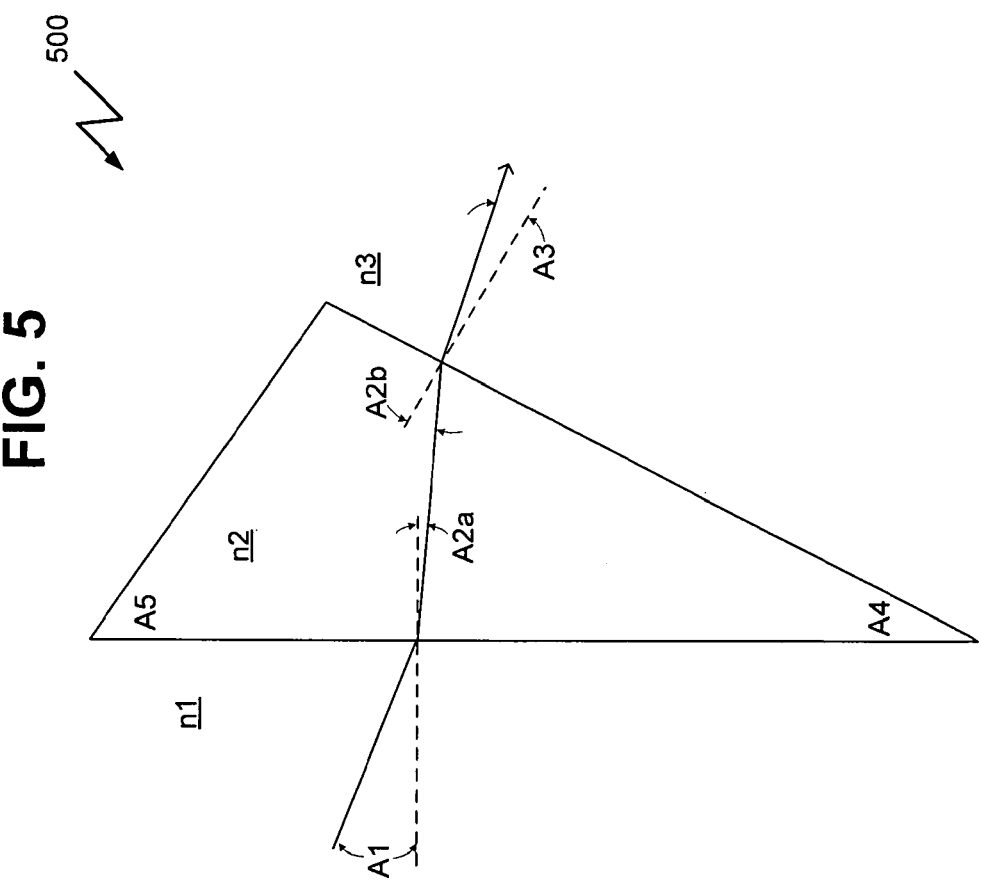
FIG. 5 depicts a prism corresponding to the first prism in FIG. 4A, and illustrates four significant variables used to derive the internal apex angles of the first prism and the corresponding internal apex angles of the second prism.

FIG. 5 depicts a prism 500 corresponding to the first prism 102 in FIG. 4A, and illustrates four significant variables used to derive the internal apex angles of the first prism 102 and the corresponding internal apex angles of the second prism 102. The four significant variables illustrated in FIG. 5 are the incident cone angle (A1), the prism angle (A4) (which corresponds to the first internal apex angle 406 of the first prim in FIG. 4A), prism index (n2), and bonding layer or cement index (n3).

Assuming a collimated, orthogonal incident ray on the entrance pupil, the internal angle with respect to the prism hypotenuse (A2b) is the internal apex angle, A4, of the prism 500. If a cone angle is introduced (e.g., a LWIR or VNIR light ray enters the entrance pupil at the cone angle A1), then the most extreme ray angle (A1) may be used to describe the worst-case transmission and reflection angles through the prism 500. Depending on the index of the prism 500, the angle of this ray is reduced (assuming an incident medium of air, $n_1=1$) according to equation (1).

$$A2a = a\sin\left(\frac{1}{n_2}\sin(A1)\right) \quad (1)$$

This ray is transmitted through the medium of the prism 500 until it encounters the exit surface (which corresponds to the partial reflecting surface 108 of the first prism 102), where the incident angle, A2b, must be redefined with respect to the hypotenuse (A4) as reflected in equation (2).

$$A2b = A2a + (90 - A4) \quad (2)$$

Angle A2a is increased by the factor 90−A4, where A4=90 degrees for two parallel surfaces (for manufacturing purposes, specified prism angle is in fact 90−A4, using the conventions in FIG. 5). As angle A2b increases, a critical angle for internal reflection is approached. At or above the critical angle, transmission occurs parallel to the exit surface (90 degrees), and all rays are instead internally reflected. Assuming A3=90 degrees, the critical angle ($\theta_c$) for angle A2b can be defined according to Snell's Law reflected in equation (3) below.

$$\theta_c = a\sin\left(\frac{n_3}{n_2}\right) \quad (3)$$

Assuming the prism 500 is comprised of zinc selenide ($n_2 \approx 2.5$ for visible wavelengths) and the bonding layer is comprised of Norland 61 epoxy ($n_3 \approx 1.56$), then the critical angle ($\theta_c$) is approximately equal to 38.6 degrees. For a system with a maximum half angle of 20 degrees (40 degree field of view) and prism internal apex angle (A4) of 28 degrees, the incident angle for the exit surface (A2b) is approximately 35.9 degrees in accordance with equation (2). In this implementation, transmission occurs only when the prism angle (A2b) is below 30 (e.g., A4=60) degrees. For collimated light, this maximum angle becomes approximately 38 (A4=52) degrees. As previously discussed, in a preferred implementation, the prism internal apex angle (A4) of prism 102 is 27.5 degrees.

The indices of both the material used to form the first and second prisms 102 and 104 as well as the bonding layer 404 material affect the determination of the critical angle for A2b (when total internal reflection of rays incident on the exit surface occurs rather than transmission) and, as well as, the determination of the exit ray angles. As shown previously in equation 2, the ratio of bonding layer material or epoxy index to prism index will drive the critical angle. Increasing the refractive index of the bonding layer material or decreasing the prism indices would both serve to increase the critical angle, and thus the range of available prism and cone angles. Since most optical epoxies are limited to index values under 1.57, the prism index becomes the variable of choice. For example, zinc sulfide ($n_2 \approx 2.3$) increases the critical angle to approximately 42 degrees. In another implementation, the prisms 102, 106 and 500 may comprise fluoride materials (e.g., calcium fluoride or barium fluoride) that transmit well in NIR wavelength regions, but are significantly less desirable due to their coating adhesion properties, thermal stability, and tensile strength.

As shown in FIG. 4A, the waveband separating surfaces of the first and second prisms 102 and 104 are connected throughout in an unbroken sequence, such that double images and the concomitant deterioration in image quality associated with double images are prevented. Moreover, since the two prisms 102 and 104 are operatively configured to receive and separate two light wavebands (e.g., LWIR and VNIR bands) emanating from the same object 50 or scene via a common entrance pupil 108, the images captured at the respective camera image plane 118 or 120 may be processed by the back-end processor 126 and displayed on a display (not shown in figures) without the effects of parallax that result from viewing an object scene using two cameras with separate entrance pupils and objective lenses.

Figure 6:
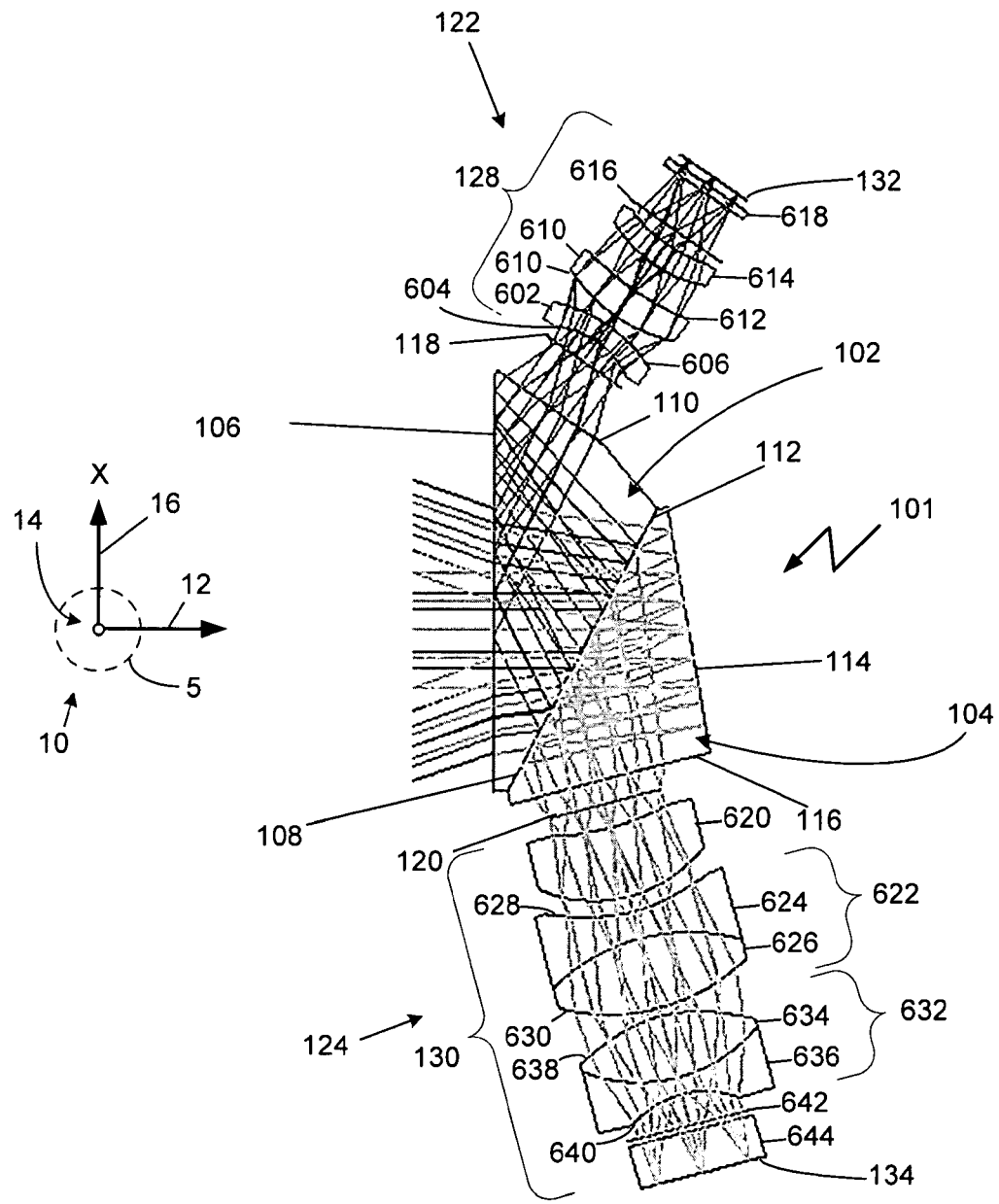
FIG. 6 is a sectional top view of the compact lens assembly, one embodiment of a LWIR camera of the imaging device and one embodiment of a VWIR camera of the imaging device arranged for mounting on the front of the helmet in accordance with the present invention such that the LWIR camera receives the emitted light waveband from the first prism and the VNIR camera receives the specular light waveband from the second prism.

FIG. 6 is a sectional top view of the compact lens assembly 101, one embodiment of the LWIR camera 122 of the imaging device 100 and one embodiment of a VNIR camera 124 of the imaging device 100 arranged for mounting on the front of the helmet 5 in accordance with the present invention such that the LWIR camera 122 receives the first light waveband (e.g., the object's emitted light waveband) from the first prism 102 and the VNIR camera 124 receives the second light waveband (e.g., the object's reflected specular light waveband) from the second prism 104. In the implementation shown in FIG. 6, the waveband objective lens assembly 128 of the LWIR camera 122 includes, in sequence of light propagation from the exit or second transmitting surface C 110 of the first prism 102 or from the entrance pupil plane 118 of objective lens assembly 128, the following optical elements: a negative power meniscus lens 602 having a first surface 604 and a second surface 606 (each of which may be spherical or employ an aspherodiffractive surface or kinoform surface); a power lens 608 having a front convex surface 610 and a rear surface 612 that may be spherical or planar; a positive power lens 614 (which may be a positive meniscus lens); and a plane parallel plate 618, which represents the window of the LWIR camera 122 and allows transmission of the second light waveband towards the pixel focal plane array 132. The plane parallel plate 618 and the pixel focal plane array 132 may be incorporated into the objective lens assembly 128 of the LWIR camera 122.

The pixel focal plane array 132 may include an array of micro-bolometer pixels adapted to capture an LWIR image corresponding to the first light waveband (as emitted from the first prism exit surface C 110) that is received by the pixels or micro-bolometers over an integration period controlled by the back-end processor 126 using standard imaging techniques.

In the implementation shown in FIG. 6, the waveband objective lens assembly 130 of the VNIR camera 124 includes, in sequence of light propagation from the exit or second transmitting surface F 116 of the second prism 104 or from the objective lens entrance pupil plane 120, the following optical elements: a positive power lens 620 facing the exit surface F 116 of the second prism 104; a first achromatic doublet 622 having a negative power lens 624 and a positive power lens 626 where the front surface 628 of the negative power lens 624 faces the positive power lens 620 and the rear surface 630 of the positive power lens 626 faces away from the lens 624; a second achromatic doublet 632 having a positive power lens 634 and a negative power lens 636 where the front surface 638 of the positive power lens 634 faces the first achromatic doublet 622 and the rear surface 640 of the negative power lens 636 faces away from the lens 634; and a plane parallel plate or window 644. The plate or window 644 represents the window of the VNIR camera 124. In the implementation shown in FIG. 6, the plane parallel plate or window 644 has a rear surface that corresponds to the pixel focal plane array 134 of the VNIR camera 124. The plane parallel plate or window 644 may be incorporated into the objective lens assembly 130 of the VNIR camera 124.

The pixel focal plane array 134 may include an array of pixels (such as micro-bolometers or photodetectors) adapted to capture a VNIR image corresponding to the second light waveband (as emitted from the second prism exit surface F 116) that is received by the pixels over an integration period controlled by the back-end processor 126 using standard imaging techniques. The back-end processor 126 may be configured to synchronize the trigger and control of the LWIR camera 122 and the VNIR camera 124 such that each of the pixel focal plane arrays 132 and 134 simultaneously capture a respective image (i.e., a LWIR image and a VNIR image) from the same object 5 scene as viewed through the same entrance pupil 106 of the objective lens assembly 101. The back-end processor 126 may also be configured to provide the simultaneously captured LWIR image and VNIR image to a display (not shown in figures) so that a user may view the two images of the same object 5 scene without the effects of parallax.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What I claim is:

1. An imaging device suitable for simultaneously imaging a plurality of light wavebands, comprising:
   an objective lens assembly comprising a first prism and a second prism disposed along a central axis of the objective lens assembly, wherein the objective lens assembly is operatively configured to receive light reflected from an object through an entrance pupil, the first prism is operable to internally reflect a first light waveband to a transmitting surface of the first prism and pass a second light waveband to the second prism, and wherein the second prism is operable to internally reflect the second light waveband to a transmitting surface of the second prism;
   a first camera disposed along an optical path after the transmitting surface of the first prism, wherein the first camera comprises a first waveband objective lens assembly, which includes a first plurality of lenses, configured to receive the first light waveband and a first detector, the first waveband objective lens assembly configured to refract the first portion of the light exiting the first prism to form a first image at the first detector; and
   a second camera disposed along an optical path after the transmitting surface of the second prism, wherein the second camera comprises a second waveband objective lens assembly, which includes a second plurality of lenses, configured to receive the second light waveband and a second detector, the second waveband objective lens assembly configured to refract the second portion of the light exiting the second prism to form a second image at the second detector; and
   a processor configured to synchronize control of the first camera and the second camera such that the first detector and second detector simultaneously capture a respective image of the object as viewed through the entrance pupil of the objective lens assembly.

2. The imaging device of claim 1, wherein the first plurality of lenses comprises, in sequence of light propagation from the transmitting surface of the first prism to the first detector:
   a negative power lens;
   a power lens; and
   a positive power lens.

3. The imaging device of claim 2, wherein the negative power lens is a negative power meniscus lens which includes a first surface and a second surface, and wherein the first and second surfaces can each be one of spherical, asphero-diffractive or kino-form.

4. The imaging device of claim 2 wherein the power lens includes a front convex surface and a planar or spherical rear surface.

5. The imaging device of claim 1, wherein the second plurality of lenses comprises, in sequence of light propagation from the transmitting surface of the second prism to the second detector:
   a first positive power lens;
   a first achromatic doublet; and
   a second achromatic doublet.

6. The imaging device of claim 5, wherein the first achromatic doublet comprises a first negative power lens and a second positive power lens, and wherein a front surface of the first negative power lens faces the first positive power lens and a rear surface of the second positive lens faces away from the first negative power lens.

7. The imaging device of claim 5 wherein the second achromatic doublet comprises a third positive power lens and a second negative lens, and wherein a front surface of the third positive power lens faces the first achromatic doublet and a rear surface of the second negative lens faces away from the third positive power lens.

8. The imaging device of claim 1, wherein the processor is further configured to provide the simultaneously captured images of the object to a helmet-mounted display.

9. The imaging device of claim 1, wherein the first portion of the passed light is within the long wave infrared band.

10. The imaging device of claim 1, wherein the second portion of the passed light is within the near-infrared band.

* * * * *